(12) United States Patent
Liao

(10) Patent No.: US 11,885,459 B2
(45) Date of Patent: Jan. 30, 2024

(54) HANDHELD GIMBAL CONTROL METHOD AND CONTROL APPARATUS

(71) Applicant: GUILIN ZHISHEN INFORMATION TECHNOLOGY CO., LTD., Guilin (CN)

(72) Inventor: Yilun Liao, Guangxi (CN)

(73) Assignee: GUILIN ZHISHEN INFORMATION TECHNOLOGY CO., LTD., Guangxi (CN)

( * ) Notice: Subject to any disclaimer, the term of this patent is extended or adjusted under 35 U.S.C. 154(b) by 638 days.

(21) Appl. No.: 16/968,588

(22) PCT Filed: May 4, 2018

(86) PCT No.: PCT/CN2018/085554
§ 371 (c)(1),
(2) Date: Oct. 17, 2021

(87) PCT Pub. No.: WO2019/153558
PCT Pub. Date: Aug. 15, 2019

(65) Prior Publication Data
US 2022/0034446 A1    Feb. 3, 2022

(30) Foreign Application Priority Data
Feb. 9, 2018  (CN) .......................... 201810132674.5

(51) Int. Cl.
*F16M 11/12* (2006.01)
*F16M 11/18* (2006.01)
(Continued)

(52) U.S. Cl.
CPC .......... *F16M 11/123* (2013.01); *F16M 11/18* (2013.01); *F16M 13/04* (2013.01); *G03B 17/561* (2013.01); *F16M 2200/041* (2013.01)

(58) Field of Classification Search
None
See application file for complete search history.

(56) References Cited

U.S. PATENT DOCUMENTS 10,394,107 B2    8/2019  Wang et al.
2015/0365572 A1  12/2015 Fan
(Continued)

FOREIGN PATENT DOCUMENTS

CN    102662404 A    9/2012
CN    103268124 A    8/2013
(Continued)

OTHER PUBLICATIONS

International Search Report for PCT/CN2018/086674 dated Oct. 25, 2018.
Search Report for Priority Application CN201810132674.5 dated Aug. 24, 2018.
Search Report for Priority Application CN201810133873.8 dated May 28, 2018.
(Continued)

*Primary Examiner* — Rodney E Fuller
(74) *Attorney, Agent, or Firm* — Rimon PC; Zhun Lu

(57) ABSTRACT

Provided are a handheld gimbal control method and control apparatus. The control method comprises the following steps: step 1) detecting a current mode of the handheld gimbal; step 2) when the handheld gimbal is in an operating mode, detecting whether the handheld gimbal is at a folding position, and when the handheld gimbal is at the folding position, enabling the handheld gimbal to enter a standby mode; and step 3) when the handheld gimbal is in the standby mode, detecting whether the handheld gimbal is at a non-folding position, and when the handheld gimbal is at the non-folding position, enabling the handheld gimbal to enter the operating mode, wherein there is no sequential order for the execution of steps 2) and 3). The control method of the present invention enables a user to rapidly and conveniently operate a handheld gimbal, without damaging an electric motor.

15 Claims, 4 Drawing Sheets

(51) Int. Cl.
*F16M 13/04* (2006.01)
*G03B 17/56* (2021.01)

(56) References Cited

U.S. PATENT DOCUMENTS

2020/0041878 A1\* 2/2020 Lan .................... G10L 15/22
2021/0200247 A1\* 7/2021 Fan .................... G05B 19/19

FOREIGN PATENT DOCUMENTS

| CN | 105491293 A | 4/2016 |
|---|---|---|
| CN | 105759853 A | 7/2016 |
| CN | 205921657 U | 2/2017 |
| CN | 107079103 A | 8/2017 |
| WO | WO-2016000194 A1 | 1/2016 |

OTHER PUBLICATIONS

Written Opinion of the International Searching Authority for PCT/CN2018/086674 dated Oct. 25, 2018.
Decision to Grant a Patent for Japanese Application No. 2020-540489, dated May 10, 2022 (3 pages).
English Translation of Decision to Grant a Patent for Japanese Application No. 2020-540489, dated May 10, 2022 (2 pages).
Notification of Reasons for Refusal for Japanese Application No. 2020-540489 dated Oct. 5, 2021.
International Preliminary Report on Patentability received for PCT Patent Application No. PCT/CN2018/085554, dated Aug. 20, 2020, 9 pages. (5 pages of English Translation and 4 pages of Original Document).
International Search Report and Written Opinion received for PCT Patent Application No. PCT/CN2018/085554 dated Nov. 2, 2018, 11 pages. (5 pages of English Translation and 6 pages of Original Document).

\* cited by examiner

US 11,885,459 B2

HANDHELD GIMBAL CONTROL METHOD AND CONTROL APPARATUS

CROSS-REFERENCE TO RELATED APPLICATIONS

This application is a national stage application (under 35 U.S.C. § 371) of PCT/CN2018/085554, filed May 4, 2018, which claims benefit of Chinese Application No. 201810132674.5, filed Feb. 9, 2018, both of which are incorporated herein by reference in their entirety.

TECHNICAL FIELD

The present invention relates to a handheld gimbal and in particular to a control method and a control device for a handheld gimbal.

BACKGROUND

As a support device for mounting and fixing a photographing apparatus (e.g., a mobile phone), a handheld gimbal is used to adjust the movement states and positions of the photographing apparatus, so that the photographing apparatus can take pictures and video stably. At present, mainstream handheld gimbals include single-axis handheld gimbals, dual-axis handheld gimbals and three-axis handheld gimbals, among which the three-axis handheld gimbals can control the movement of the photographing apparatus in three directions, thereby achieving a better photographing effect.

When a user takes pictures by a mobile phone on an existing handheld gimbal, if the user needs to make a call, answer a call or stop operating the handheld gimbal temporarily, the handheld gimbal must be powered off in order to avoid damaging a motor in the handheld gimbal. After the user ends a call, the user needs to press down the power button again to power on and restart the handheld gimbal. The handheld gimbal can operate normally only after an APP, which cooperates with the handheld gimbal, in the mobile phone is set.

However, the above control methods for current handheld gimbals are cumbersome, time-consuming and inconvenient for users.

SUMMARY

In view of the problems in the prior art, the present invention provides a control method for a handheld gimbal, the control method comprises the following steps:

step 1): detecting a current mode of the handheld gimbal;

step 2): detecting whether the handheld gimbal is in a folded position when the handheld gimbal is in an operating mode, and making the handheld gimbal enter a standby mode when the handheld gimbal is in the folded position; and step 3): detecting whether the handheld gimbal is in an unfolded position when the handheld gimbal is in the standby mode, and making the handheld gimbal enter the operating mode when the handheld gimbal is in the unfolded position;

wherein the steps 2) and 3) are executed without sequence.

Preferably, in the step 2), the handheld gimbal is kept in the operating mode when it is detected that the handheld gimbal is in the unfolded position; and, in the step 3), the handheld gimbal is kept in the standby mode when it is detected that the handheld gimbal is in the folded position.

Preferably, in the step 1), an operating state of a motor in the handheld gimbal is detected; it is determined that the handheld gimbal is in the operating mode when the motor in the handheld gimbal operates; and, it is determined that the handheld gimbal is in the standby mode when the motor in the handheld gimbal does not operate.

Preferably, the step 2) further includes powering off the motor in the handheld gimbal when the handheld gimbal is in the folded position; and, the step 3) further includes powering on the motor in the handheld gimbal when the handheld gimbal is in the unfolded position.

Preferably, the method further includes disconnecting the communication with the handheld gimbal in the standby mode and restoring the communication with the handheld gimbal in the operating mode.

Preferably, the handheld gimbal includes a roll axis motor, and a first connecting arm and a second connecting arm which are fixedly connected to the roll axis motor; there is an included angle between a central axis of the first connecting arm and a central axis of the second connecting arm; and, in the steps 2) and 3), it is determined, by measuring the included angle, whether the handheld gimbal is in the folded position or the unfolded position.

Preferably, when the included angle is not greater than a preset threshold angle, it is determined that the handheld gimbal is in the folded position; and, when the included angle is greater than the preset threshold angle, it is determined that the handheld gimbal is in the unfolded position.

Preferably, the preset threshold angle is 10°.

Preferably, the preset threshold angle is 5°.

An embodiment of the present invention further provides a control device for a handheld gimbal, including a memory and a processor, wherein the memory stores computer programs executed by the processor; and, when executing the computer programs, the processor causes the control device to execute the control method described above.

An embodiment of the present invention further provides a control device for a handheld gimbal, the control device comprises:

a folded position detection device configured to detect whether the handheld gimbal is in a folded position; and a main control unit configured to: detect the current mode of the handheld gimbal;

if the handheld gimbal is in an operating mode, make the handheld gimbal enter a standby mode when the handheld gimbal is in the folded position; and if the handheld gimbal is in the standby mode, make the handheld gimbal enter the operating mode when the handheld gimbal is in an unfolded position.

Preferably, the main control unit is further configured to: if the handheld gimbal is in the operating mode, keep the handheld gimbal in the operating mode when the handheld gimbal is in the unfolded position; and if the handheld gimbal is in the standby mode, keep the handheld gimbal in the standby mode when the handheld gimbal is in the folded position.

Preferably, the handheld gimbal includes a motor; and, the main control unit detects an operating state of the motor, determines that the handheld gimbal is in the operating mode when the motor operates, and determines that the handheld gimbal is in the standby mode when the motor does not operate.

Preferably, the control device further includes a power control device; when the handheld gimbal is in the folded position, the main control unit controls the power control device to power off the motor in the handheld gimbal; and, when the handheld gimbal is in the unfolded position, the main control unit controls the power control device to supply power to the motor in the handheld gimbal.

Preferably, the handheld gimbal includes a roll axis motor, and a first connecting arm and a second connecting arm which are fixedly connected to the roll axis motor; there is an included angle between a central axis of the first connecting arm and a central axis of the second connecting arm; and, the folded position detection device is an angle sensor for measuring the included angle.

Based on the control method of the present invention, a user stops the operation of the motor by folding the handheld gimbal, so that the user can quickly answer or make a call, and the motor will not be damaged in the process of answering or making a call. Since the handheld gimbal is not powered off in the folded state, after the user answers or makes a call, the operation of the handheld gimbal can be quickly restored simply by moving the handheld gimbal out of the folded position. It is convenient for the user to operate, and it is time-saving.

BRIEF DESCRIPTION OF THE DRAWINGS

The embodiments of the present invention will be further described below with reference to the accompanying drawings, in which.

DETAILED DESCRIPTION OF THE PRESENT INVENTION

To make the objectives, technical solutions and advantages of the present invention clearer, the present invention will be further described below in detail by way of specific embodiments with reference to the accompanying drawings.

To conveniently describe the control method of the present invention, the structure and various states of the handheld gimbal 1 will be described below with reference to FIGS. 1-3.

Figure 1:
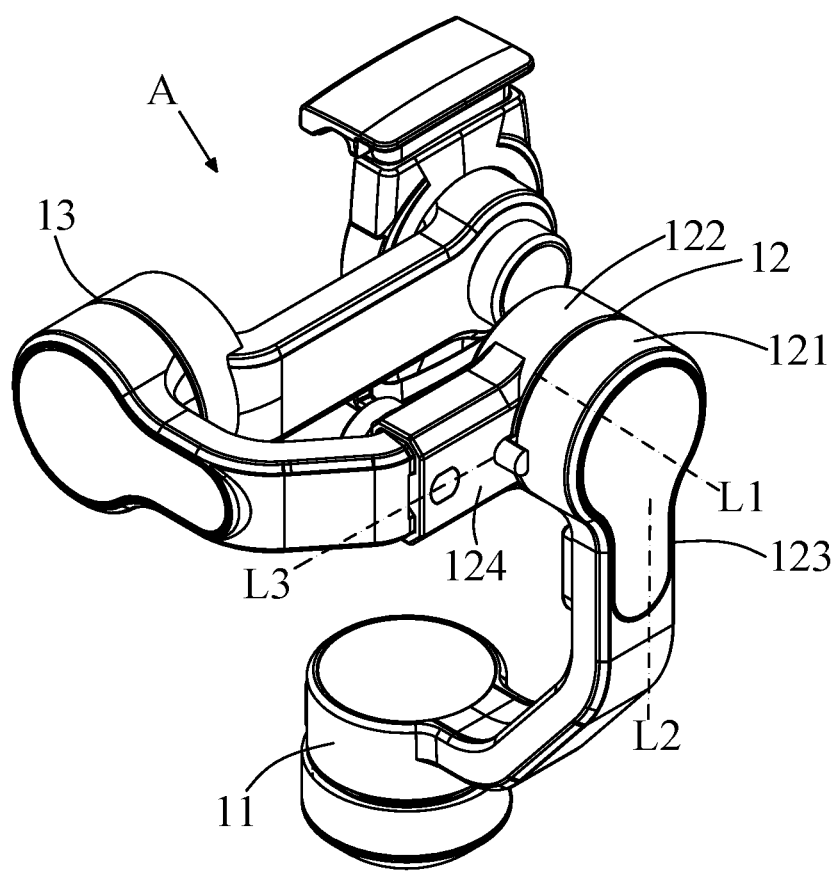
FIG. 1 is a schematic stereoscopic view of a handheld gimbal during its operation.

FIG. 1 is a schematic stereoscopic view of a handheld gimbal during its operation. FIG. 2 is a schematic planar view of the handheld gimbal shown in FIG. 1 in a direction indicated by the arrow A. As shown in FIGS. 1 and 2, the handheld gimbal 1 includes a heading axis motor 11, a roll axis motor 12 and a pitch axis motor 13, wherein a rotating axis of the heading axis motor 11, a rotating axis L1 of the roll axis motor 12 and a rotating axis of the pitch axis motor 13 are perpendicular to one another. The roll axis motor 12 includes a motor end cover 121 and a motor shell 122 which are arranged opposite to each other, a first connecting arm 123 fixedly connected to the motor end cover 121 and the heading axis motor 11, and a second connecting arm 124 fixedly connected to the motor shell 122 and the pitch axis motor 13. A central axis L2 of the first connecting arm 123 is perpendicular to the rotating axis L1 of the roll axis motor 12, and a central axis L3 of the second connecting arm 124 is perpendicular to the rotating axis L1 of the roll axis motor 12. As shown in FIGS. 1 and 2, an included angle $\theta$ between the central axis L2 and the central axis L3 is 90°.

Figure 2:
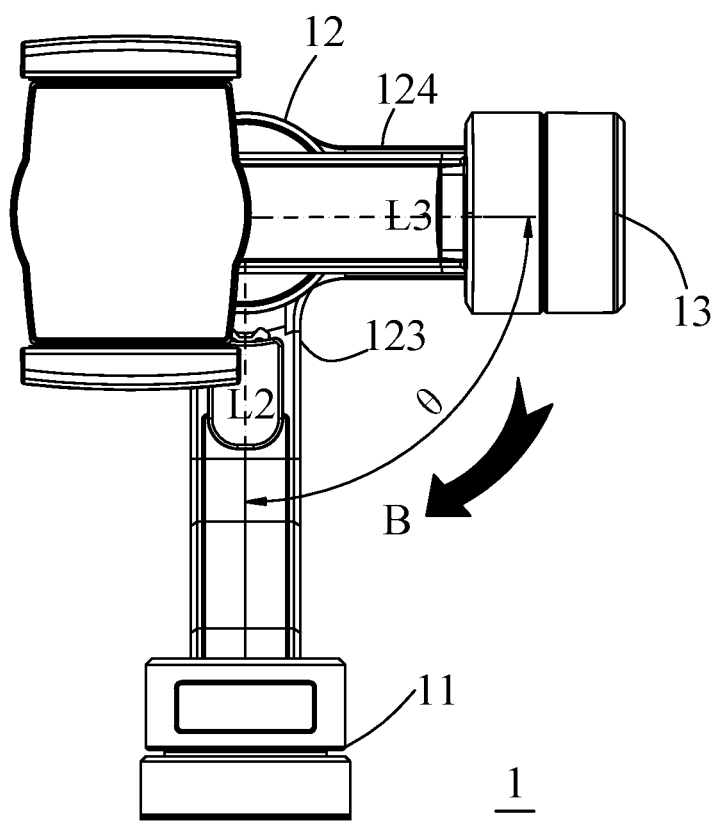
FIG. 2 is a schematic planar view of the handheld gimbal shown in FIG. 1 in a direction indicated by an arrow A.

A user may stir the second connecting arm 124 in a direction B indicated by the arrow in FIG. 2 to rotate the second connecting arm 124 by 90°, so that the included angle $\theta$ gradually decreases to 0°. As shown in FIG. 3, in this state, the handheld gimbal 1 occupies the smallest space. In accordance with an embodiment of the present invention, it is defined that the handheld gimbal 1 is in a folded position when the included angle $\theta$ is 0° to 10°, and the handheld gimbal 1 is in an unfolded position when the included angle $\theta$ is greater than 10°.

In the present application, an operating mode and a standby mode of the handheld gimbal 1 after it is powered on are defined. In accordance with an embodiment of the present invention, the operating mode means that a main control unit 24 operates and all the motors are powered on and in the operating state. In this case, the handheld gimbal system is in the normal operating state. The standby mode means that the main control unit 24 operates and all the motors are not powered on (i.e., stop operating).

Figure 4:
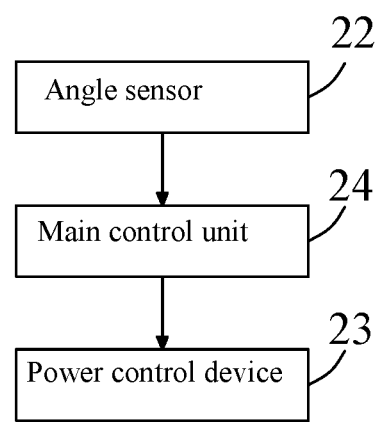
FIG. 4 is a block diagram of a control device for a handheld gimbal according to a preferred embodiment of the present invention.

FIG. 4 is a block diagram of a control device for a handheld gimbal according a preferred embodiment of the present invention. The device includes a main control unit 24, an angle sensor 32 connected to the main control unit, and a power control device 23. In accordance with an embodiment of the present invention, the angle sensor 22 is mounted on the roll axis motor 12 to measure the included angle $\theta$ between the central axis L2 and the central axis L3. The main control unit 24 is configured to detect a current mode of the handheld gimbal 1 and control the power control device 23 to power off or supply power to all the motors.

Figure 5:
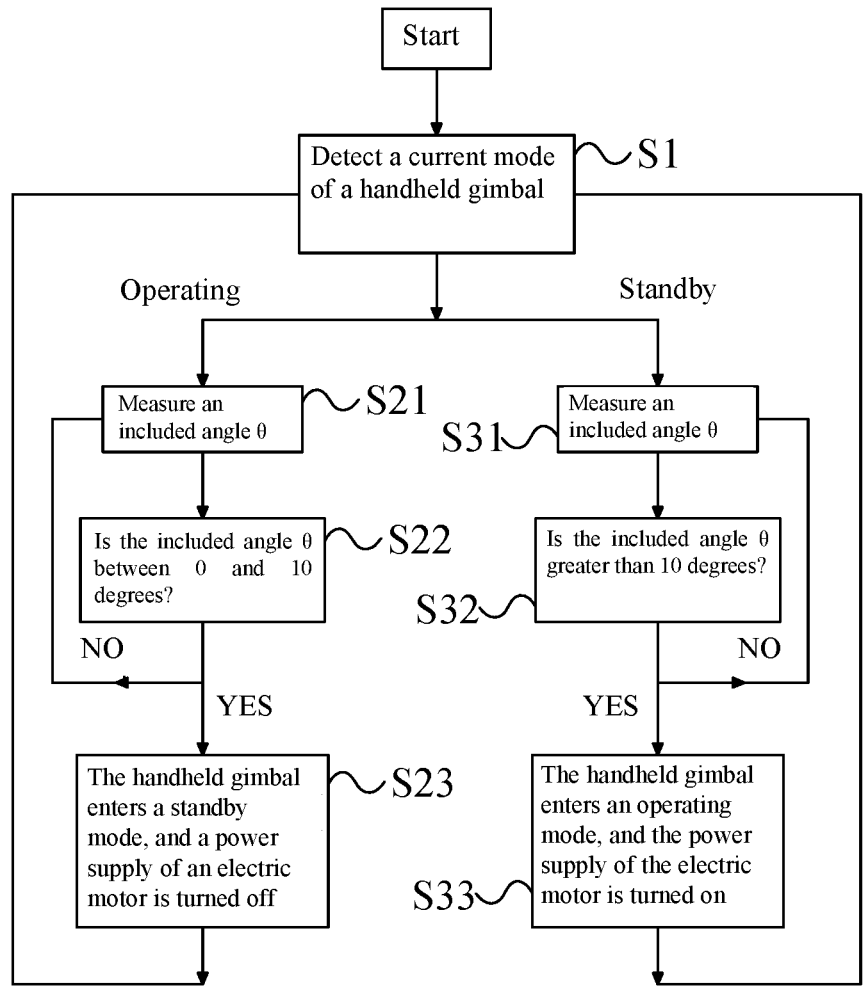
FIG. 5 is a flowchart of a control method for a handheld gimbal according to a preferred embodiment of the present invention.

FIG. 5 is a flowchart of a control method for a handheld gimbal according to a preferred embodiment of the present invention. As shown in FIG. 5, the control method includes the following steps.

It may be preset that the handheld gimbal 1 automatically enters the operating mode after being powered on. In accordance with other embodiments, it may also be preset that the handheld gimbal automatically enters the standby mode. Then, the method precedes to the following determination steps.

Step S1): The current mode of the handheld gimbal 1 is detected.

If the handheld gimbal 1 is in the operating state, the following step S21) will be executed after the step S1).

Step S21): The included angle $\theta$ is measured.

Step S22): It is determined whether the included angle $\theta$ is within a range of 0° to 10° (i.e., whether the handheld gimbal 1 is in the folded position); if the included angle $\theta$ is not within the range of 0° to 10°, the step S21) will be repeated; and, if the included angle $\theta$ is within the range of 0° to 10° (that is, the handheld gimbal 1 is in the folded position), the following step S23) will be executed.

Step S23): The handheld gimbal 1 is brought into the standby mode, and all the motors are powered off.

If the handheld gimbal 1 is in the standby state, the following step S31) will be executed after the step S1).

Step S31): The included angle $\theta$ is measured.

Step S32): It is determined whether the included angle $\theta$ is greater than 10° (i.e., whether the handheld gimbal 1 is in the unfolded position); if the included angle $\theta$ is not greater than 10°, the step S31) will be repeated; and, if the included angle θ is greater than 10° (that is, the handheld gimbal 1 is in the unfolded position), the following step S33) will be executed.

Step S33): The handheld gimbal 1 is brought into the operating mode, and all the motors are powered on.

The step S1) is repeated.

The control method will be specifically described in combination with the practical use process of the user.

A mobile phone is firstly gripped on the handheld gimbal 1, a power button on the handheld gimbal 1 is pressed down to power on the handheld gimbal 1, the Bluetooth in the mobile phone is activated, and an APP in the mobile phone is opened and set to allow the mobile phone to be connected with the handheld gimbal 1.

The user fixes the mobile phone by the handheld gimbal 1 and then takes pictures or video.

Figure 3:
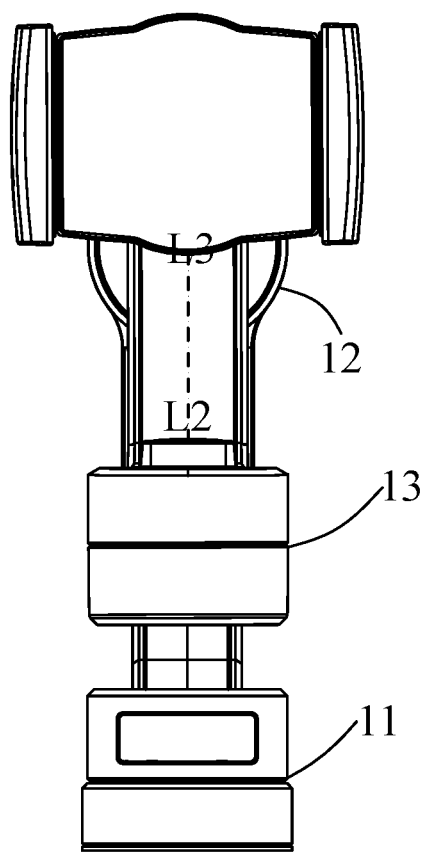
FIG. 3 is a schematic planar view of the handheld gimbal at a folded position.

During the photographing process, if the user needs to make or answer a call, the user only needs to stir the second connecting arm 124 by hands to move the handheld gimbal 1 into the folded position shown in FIG. 3, without powering off the handheld gimbal 1. In the process of stirring the second connecting arm 124 by the user, in a first stage (the included angle θ gradually decreases to) 10°, the following steps will be successively executed: step S1), step S21) and step S22); and, the steps S21) and S22) are repeated. Next, in a second stage (the included angle θ decreases from 10° to 0° or changes within 10°), the following steps will be successively executed: step S23), step S1), step S31) and step S32); and, the steps S31) and S32) are repeated.

Since all the motors are powered off in the step S23) in the second stage, in the process of making or answering a call, the power of the handheld gimbal 1 can be saved, and the motors will not be damaged. After the handheld gimbal 1 is in the folded position, the user can conveniently answer or make a call, without pressing down the power button on the handheld gimbal 1 to power off the handheld gimbal 1. When the user answers a call, the steps S31) and S32) are repeated.

When the user wants to use the mobile phone to take pictures again after finishing the call, the user only needs to stir the second connecting arm 124 to move the handheld gimbal 1 out of the folded position shown in FIG. 3, i.e., into the unfolded position. In the process of stirring the second connecting arm 124 by the user, in a third stage (the included angle θ increases from 0° to 10°), the following step will be successively executed: repeating steps S31) and step S32). In a fourth stage (the included angle θ is greater than 10°), the control process is executed as follows: step S33), step S1), step S21) and step S22); and, the steps S21) and S22) are repeated.

The user stops the operation of all the motors by folding the handheld gimbal 1, so the user can quickly get through a call, and the motors will not be damaged in the process of answering a call. Since the handheld gimbal 1 is not powered off in the folded stage, after the user finishes the call, all the motors can be powered on simply by moving the handheld gimbal 1 out of the folded position to make the handheld gimbal 1 operate normally. Thus, the operation of the handheld gimbal 1 can be quickly restored. It is convenient for the user to operate, and it is time-saving.

In another embodiment of the present invention, after the handheld gimbal 1 enters the standby mode, the communication between the mobile phone and the handheld gimbal 1 is disconnected. After the handheld gimbal 1 enters the operating mode, the communication between the mobile phone and the handheld gimbal 1 is restored.

In still another embodiment of the present invention, it is defined that the handheld gimbal 1 is in the folded position when the included angle θ is 0° to 5°. In yet another embodiment of the present invention, it is defined that the handheld gimbal 1 is in the folded position when the included angle θ is 0°. In other embodiments of the present invention, it is defined that the handheld gimbal 1 is in the folded position when the included angle θ is within other angle ranges.

In other embodiments of the present invention, a distance sensor is arranged on the first connecting arm 123 or the second connecting arm 124, and it is determined, based on the distance between the first connecting arm 123 and the second connecting arm 124, whether the handheld gimbal 1 is in the folded position.

In a further embodiment of the present invention, a switch is arranged on the first connecting arm 123 or the second connecting arm 124. The switch is triggered when the handheld gimbal 1 is in the folded position. Thus, it is determined, according to the on or off state of the switch, whether the handheld gimbal 1 is in the folded or unfolded position.

The control method of the present invention is applicable to a dual-axis handheld gimbal (which is composed of any one of a pitch axis motor 13 and a heading axis motor 11, and a roll axis motor 12) or a single-axis handheld gimbal (which is composed of a roll axis motor 12).

In yet another embodiment of the present invention, a single-axis handheld gimbal includes a roll axis motor, and the main control unit detects the operating state of the roll axis motor. When the roll axis motor operates, it is determined that the single-axis handheld gimbal is in the operating state; and, when the roll axis motor does not operate, it is determined that the single-axis handheld gimbal is in the standby state. The main control unit is further configured to: if the single-axis handheld gimbal is in the operating mode, make the single-axis handheld gimbal enter the standby mode and power off the roll axis motor when the single-axis handheld gimbal is in the folded position; and if the single-axis handheld gimbal is in the standby mode, make the single-axis handheld gimbal enter the operating mode and power on the roll axis motor when the single-axis handheld gimbal is in the unfolded position.

The present invention further provides a control device for a handheld gimbal, which includes a memory and a processor, wherein the memory stores computer programs executed by the processor; and, when executing the computer programs, the processor causes the control device to execute the control method described above.

Although the present invention has been described by the preferred embodiments, the present invention is not limited to the embodiments described herein. Various alterations and variations made without departing from the scope of the present invention shall be included.

The invention claimed is:

1. A control method for a handheld gimbal, wherein the control method comprises the following steps:
    step 1): detecting a current mode of the handheld gimbal;
    step 2): detecting whether the handheld gimbal is in a folded position when the handheld gimbal is in an operating mode, and making the handheld gimbal enter a standby mode when the handheld gimbal is in the folded position; and
    step 3): detecting whether the handheld gimbal is in an unfolded position when the handheld gimbal is in the standby mode, and making the handheld gimbal enter the operating mode when the handheld gimbal is in the unfolded position;

wherein the steps 2) and 3) are executed without sequence.

2. The control method according to claim 1, wherein in the step 2), the handheld gimbal is kept in the operating mode when it is detected that the handheld gimbal is in the unfolded position; and, in the step 3), the handheld gimbal is kept in the standby mode when it is detected that the handheld gimbal is in the folded position.

3. The control method according to claim 1, wherein in the step 1), an operating state of a motor in the handheld gimbal is detected; it is determined that the handheld gimbal is in the operating mode when the motor in the handheld gimbal operates; and, it is determined that the handheld gimbal is in the standby mode when the motor in the handheld gimbal does not operate.

4. The control method according to claim 1, wherein the step 2) further comprises powering off the motor in the handheld gimbal when the handheld gimbal is in the folded position; and, the step 3) further comprises powering on the motor in the handheld gimbal when the handheld gimbal is in the unfolded position.

5. The control method according to claim 4, further comprising disconnecting the communication with the handheld gimbal in the standby mode and restoring the communication with the handheld gimbal in the operating mode.

6. The control method according to claim 1, the handheld gimbal comprises a roll axis motor, and a first connecting arm and a second connecting arm which are fixedly connected to the roll axis motor, there is an included angle between a central axis of the first connecting arm and a central axis of the second connecting arm, wherein, in the steps 2) and 3), it is determined, by measuring the included angle, whether the handheld gimbal is in the folded position or the unfolded position.

7. The control method according to claim 6, wherein when the included angle is not greater than a preset threshold angle, it is determined that the handheld gimbal is in the folded position; and, when the included angle is greater than the preset threshold angle, it is determined that the handheld gimbal is in the unfolded position.

8. The control method according to claim 7, wherein the preset threshold angle is 10°.

9. The control method according to claim 7, wherein the preset threshold angle is 5°.

10. A control device for a handheld gimbal, comprising a memory and a processor, wherein, the memory stores computer programs executed by the processor; and when executing the computer programs, the processor causes the control device to execute the control method according to claim 1.

11. A control device for a handheld gimbal, wherein the control device comprises:

a folded position detection device configured to detect whether the handheld gimbal is in a folded position; and a main control unit configured to: detect the current mode of the handheld gimbal;

if the handheld gimbal is in an operating mode, make the handheld gimbal enter a standby mode when the handheld gimbal is in the folded position; and if the handheld gimbal is in the standby mode, make the handheld gimbal enter the operating mode when the handheld gimbal is in an unfolded position.

12. The control device according to claim 11, wherein the main control unit is further configured to:

if the handheld gimbal is in the operating mode, keep the handheld gimbal in the operating mode when the handheld gimbal is in the unfolded position; and if the handheld gimbal is in the standby mode, keep the handheld gimbal in the standby mode when the handheld gimbal is in the folded position.

13. The control device according to claim 11, wherein the handheld gimbal comprises a motor; and, the main control unit detects an operating state of the motor, determines that the handheld gimbal is in the operating mode when the motor operates, and determines that the handheld gimbal is in the standby mode when the motor does not operate.

14. The control device according to claim 11, wherein the control device further comprises a power control device; when the handheld gimbal is in the folded position, the main control unit controls the power control device to power off the motor in the handheld gimbal; and, when the handheld gimbal is in the unfolded position, the main control unit controls the power control device to supply power to the motor in the handheld gimbal.

15. The control device according to claim 11, wherein the handheld gimbal comprises a roll axis motor, and a first connecting arm and a second connecting arm which are fixedly connected to the roll axis motor; there is an included angle between a central axis of the first connecting arm and a central axis of the second connecting arm; wherein the folded position detection device is an angle sensor for measuring the included angle.

* * * * *